FINISHING WHEELS

Original Filed Sept. 7, 1965 2 Sheets-Sheet 1

INVENTOR
JAMES A. BELANGER
BY
Whittemore, Hulbert & Belknap ATTORNEYS

INVENTOR
JAMES A. BELANGER
BY
Whittemore, Hulbert & Belknap
ATTORNEYS

United States Patent Office

Re. 28,118
Reissued Aug. 20, 1974

28,118
FINISHING WHEELS

James A. Belanger, Livonia, Mich., assignor to Belanger, Inc., Northville, Mich.

Original No. 3,535,833, dated Oct. 27, 1970, Ser. No. 822,776, Feb. 24, 1969, which is a division of application Ser. No. 485,497, Sept. 7, 1965, now Patent No. 3,455,068. Application for reissue Apr. 14, 1971, Ser. No. 133,856

Int. Cl. B21b *9/02*

U.S. Cl. 51—337 13 Claims

Matter enclosed in heavy brackets [ ] appears in the original patent but forms no part of this reissue specification; matter printed in italics indicates the additions made by reissue.

ABSTRACT OF THE DISCLOSURE

A rotary carrier affords a plurality of annular, axially spaced grooves in its outer surface, and a plurality of parallel pins extend through these grooves and rim portions of the carrier spacing the grooves from one another. The pins parallel the carrier axis, and a plurality of generally radially extending finishing flaps are pivoted on the pins, each flap being provided with retainer loop means on the radially inner end thereof. Such means is received in a carrier groove, the pin extending through the loop opening of the flap retainer means to mount the finishing flap for pivotal movement.

This application is a division of my copending application, Ser. No. 485,497, filed Sept. 7, 1965, now Pat. No. 3,455,068.

This invention relates to a finishing wheel or tool and more particularly to a power driven wheel or tool for finishing metal or other relatively hard surfaces. The invention is particularly adapted for buffing wheels, polishing wheels and like apparatuses for effecting grinding, polishing, brushing, buffing, burnishing and other surfacing operations.

Many of the finishing wheels presently available on the market have certain deficiencies which contribute to the fact that the wheels do not maintain their balance. This is due to the fact that the finishing flaps are not uniformly spaced at the point of attachment to the hub or core. An unbalanced wheel regardless of the cause does not perform an effective or desirable surfacing operation.

The present invention illustrates two forms of finishing wheels which have overcome the aforementioned problems. The finishing wheel of each embodiment maintains its balance throughout its useful life, because the design of each wheel insures uniform distribution of the finishing units or flaps around the hub or core.

One embodiment of the present invention is characterized by utilizing a rotary carrier provided with a series of circumferentially extending outwardly opening grooves. A plurality of axially extending angularly spaced openings are provided in the carrier intermediate the outer periphery of the carrier and the bottom of the grooves. Each opening consists of a plurality of annular bearing points. Located in the bearing points of each opening is a mounting element such as a pin to which a finishing flap is appropriately connected. Each flap and corresponding pin are arranged to pivot with respect to the aforementioned bearing points of the carrier through a small but predetermined angular extent to help maintain the wheel in proper balance.

The other embodiment of the present invention is characterized by having a cartridge consisting of two end plates or fixtures which are spaced axially apart. Each plate is provided in the outer periphery thereof with a plurality of circumferentially spaced radially extending outwardly opening slots. Extending between the aligned pairs of corresponding slots in the end plates are a plurality of anchor pins or elements for mounting the flaps of the finishing tool. Both end plates or fixtures serve several important functions. First of all, the end plates locate each anchor pin at a particular angular location on the periphery or circumference of the wheel. Secondly, the end plates form a five-way lock so that each pin cannot move radially inwardly toward the axis of the tool or move circumferentially in either direction or move lengthwise in either direction parallel to the rotary axis of the wheel. With such a construction the pins are only adapted to move radially outwardly but such movement is prevented by the use of end caps or covers provided with annular grooves which receive the ends of the pins extending beyond the outer surfaces of the end plates or fixtures. The finishing flaps are in turn appropriately connected to the pins and are arranged close together in a pack. The finishing tool or wheel is in balance and such balance is maintained because the pins and flaps are maintained in a fixed position.

It is an object of the present invention to provide a wheel which will remain in balance throughout its useful life.

Another object of the present invention is to provide a finishing tool comprising a rotary carrier having a plurality of circumferentially extending endless grooves in the outer surface of the carrier, a plurality of mounting elements extending axially through the grooves and pivotally carried by the carrier, a plurality of generally radially extending finishing flaps having inner and outer ends, each flap being provided with retainer means on the inner end thereof which is received in the grooves, said mounting elements extending through the retainer means of the finishing flaps so as to constitute the sole means for pivotally mounting the finishing flaps.

Another object of the present invention is to provide a finishing tool of the aforementioned type wherein each of the retainer means is in the form of a belt lacing having a plurality of closed loops and each of the mounting elements is in the form of an elongated pin.

Still another object of the present invention is to provide a finishing tool of the aforementioned type wherein the grooves are of uniform depth.

A further object of the present invention is to provide a finishing tool comprising a rotary carrier having an axis and a pair of axially spaced end plates, said plates having a plurality of radially extending outwardly opening slots therein, the slots in one of the plates being axially aligned with the corresponding slots in the other of the plates, the plates at the bottom of the slots forming retainer means, a plurality of axially extending elongated pins in the slots and fixedly carried by said plates, said pins each having a pair of radially extending downwardly opening slots therein which receive the corresponding retainer means on the plates, and a plurality of generally radially extending finishing flaps connected to the pins.

Another object of the present invention is to provide a finishing tool of the aforementioned type wherein the axial ends of the pins extend radially outwardly beyond the outer surfaces of the plates.

Still another object of the present invention is to provide a finishing tool of the aforementioned type wherein a pair of end covers are provided, each cover having an endless groove therein on the inner surface thereof, each cover being mounted adjacent the outer surface of one of the plates with the ends of the [pines] *pins* extending from said one plate received in the corresponding groove.

A further object of the present invention is to provide a finishing tool of the aforementioned type wherein the covers are in surface to surface contact with the plates.

A still further object of the present invention is to provide a finishing tool of the aforementioned type wherein some of the pins are provided with teeth which engage the inner surfaces of the flaps.

Another object of the present invention is to provide a finishing tool of the aforementioned type wherein each of the pins is connected to a finishing flap by means of a resilient clip.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

Figure 1:
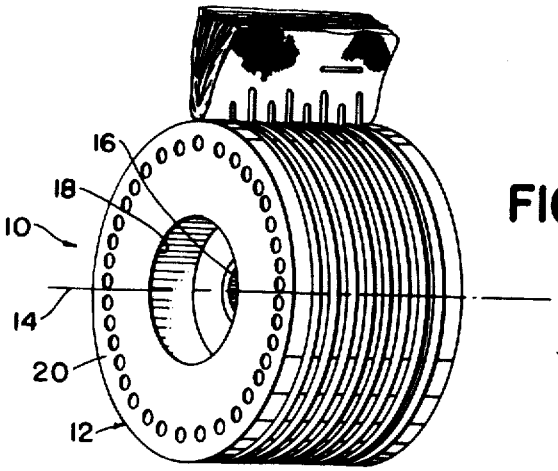
FIG. 1 is a perspective view of one embodiment of the present invention.
Figure 2:
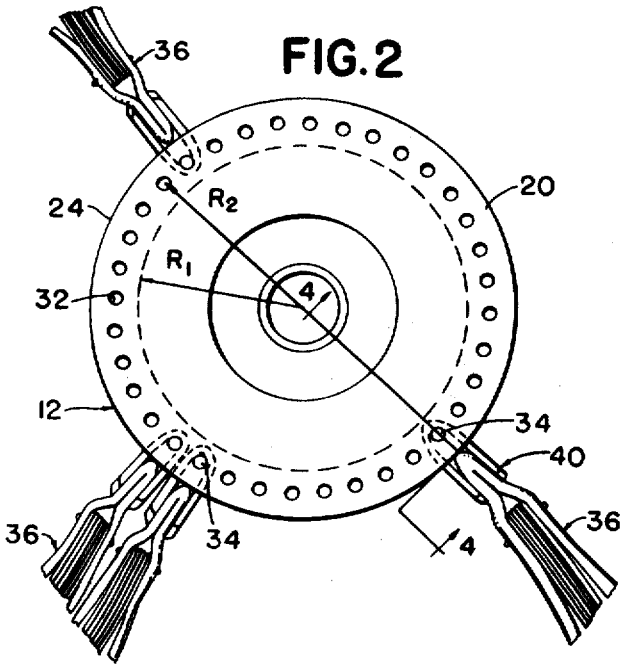
FIG. 2 is a front elevation of the finishing tool illustrated in FIG. 1.
Figure 3:
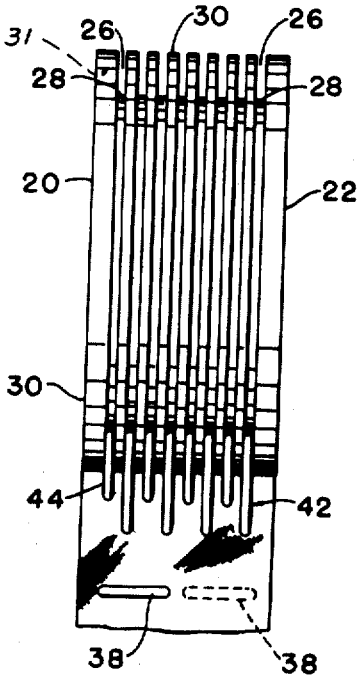
FIG. 3 is a side elevation of the finishing tool illustrated in FIGS. 1 and 2.
Figure 4:
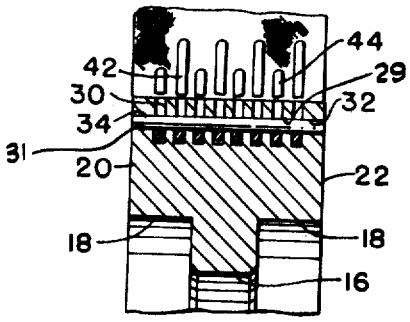
FIG. 4 is a sectional view taken on the line 4—4 of FIG. 2.
Figure 5:
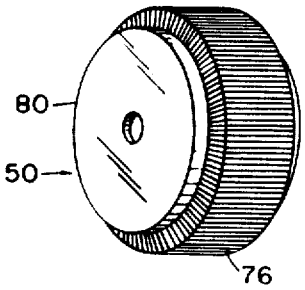
FIG. 5 is a perspective view of another embodiment of the present invention.

FIGS. 1–4 illustrate one form of finishing wheel or tool 10. The tool 10 *is in the form of an abrasive drum which* includes, as an example, a one-piece cylindrical hub or carrier 12 having a rotary axis 14. The hub 12, which can also be constructed with more than one piece, is made from a suitable metal such as aluminum or plastic material such as nylon by, as an example, an injection molding operation. An axial bore 16 extends completely through the center of the carrier 12, with the opposite ends thereof enlarged or counterbored to form recesses 18 in the two end faces or surfaces 20 and 22 as best illustrated in FIG. 4. The hub or carrier 12 is adapted to be mounted on and appropriately secured to a power driven drive shaft, not shown, which extends through bore 16, in a manner well known and understood in the art.

The outer periphery 24 of the carrier 12 is provided with a pluality of circumferentially extending endless *peripheral recesses or* grooves 26, *arranged as axially or longitudinally spaced rows,* as an example, a total of eight grooves 26 as shown in FIG. 3. The grooves 26 are of uniform depth and each groove 26 includes an inner or bottom endless surface 28 arranged on a radius $R_1$, as shown in FIG. 2. The grooves 26 are separated by radially extending relatively thin *peripheral ribs,* rims or walls 30 which are integral with the main portion of the carrier 12.

The carrier or hub 12 is further provided with a plurality of laterally extending circumferentially spaced *and axially aligned passages,* holes or openings 32 *in its ribs 30, interconnecting the grooves 26 and* having their centers arranged in a circle having a radius $R_2$ as best illustrated in FIG. 2. The holes 32 are [space] *arranged as a series of rows spaced* circumferentially apart an equal distance. As an example, for *a* carrier having 60 openings 32, each opening 32 would be spaced 6° from adjacent openings. Each opening 32 extends through the end face 20, rims 30 and end face 22 intermediate the outer periphery 24 of the hub 12 and the bottom surfaces 28 of grooves 26 so as to form a plurality of spaced annular bearing points. FIG. 3 illustrates each opening 32 as having, as an example, seven bearings points 29 intermediate the two end bearing points 31.

A plurality of elongated pivot pins *or retainer rods* 34 of circular cross section are *removably or releasably* mounted in each of the aforementioned *passages or* openings 32 and upon which are mounted a series of replaceable finishing flaps 36 *in the form of assemblies or packs of radially and longitudinally extending, flexible abrasive sheets.* The pins 32 may be made from a fibrous or plastic material or from a suitable metal. The finishing flaps 36 may be made from any suitable material presently utilized such as leather, cloth, sisal, coated abrasive cloth or other fibrous material or fabric. The material may be dipped in a solution of resin or other suitable materials so as to vary the hardness of the flap as is conventional in the art.

Each flap 36 is of U-shaped cross section with opposite sides thereof appropriately secured together, as an example by means of staples 38 as shown in FIG. 3. The inner end of each flap 36 is provided *along its radially inner longitudinal edge* with suitable retainer means 40, *shown* in the form of a belt lacing 42. The belt lacing 42 includes a plurality of closed loops or elements 44 corresponding in number to the number of grooves 26 provided in the outer periphery 24 of the hub 12. Continuing with the aforementioned example, eight such elements or loops 44 are provided on each flap 36 [and are], *extending inwardly from the longitudinal flap edge and being* received in the corresponding eight grooves 26 as illustrated in FIGS. 3 and 4. The belt lacing 42 may be clinched or otherwise secured to the flap 36. After each flap 36 has been provided with the belt lacing 42 in the manner just described the flap 36 is inserted in the carrier 12 with all eight loops 44 received within the grooves 26. Thereafter a pin 34 is inserted through an opening 32 so as to extend through the end surface 20, rims 30, the loops 44 of the belt lacing 42 and finally through the end surface 22 of the carrier 12 as best illustrated in FIG. 4.

The flaps 36 are thus supported by pins 34 so that their ends extend radially outwardly. In addition the flaps 36 are arranged in side by side relationship so as to form a pack of finishing flaps on the hub 12. By arranging the flaps 36 and pivot pins 34 in the manner just described the flaps 36 are mounted for relatively sight but a predetermined amount of circumferential movement. The amount of movement is dependent on the number of flaps 36 utilized and the location of adjacent flaps 36.

It has been found that the finishing tool 10 remains in balance throughout the normal life of the finishing flaps 36. It is believed that this balance is attained due to the fact that the flaps 36 are mounted for a relatively small but a predetermined amount of circumferential movement. It should be noted that the component parts of the finishing tool 10 are constructed and arranged so that the flaps 36 may be readily replaced from time to time as they wear out. To replace the used flaps 36 on the carrier 12 it is first necessary to remove all of the pins 34 and thereby permit the flaps 36 to be withdrawn from the carrier 12. Thereafter new finishing flaps 36 are mounted on the carrier 12 in a manner described heretofore. A punch or other suitable tool may be used to assist in removing the pins 34.

It should also be understood that other types of pivot mountings may be utilized in order to pivotally mount the flaps 36 on the carrier 12.

When the tool 10 is to be used the operator, after connecting the tool 10 to a source of power, brings the rotating carrier into proximity with the work, with its axis of rotation substantially parallel with the surface to be treated, until the ends of the flaps 36 contact the surface as is well known in the art.

Figure 6:
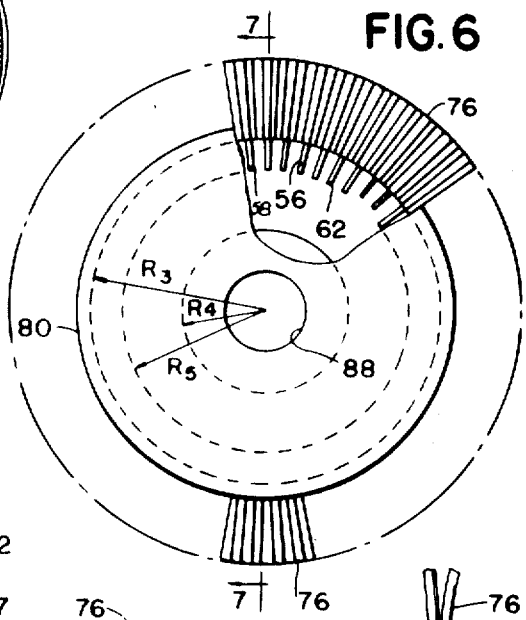
FIG. 6 is a front elevation of the finishing tool illustrated in FIG. 5, with parts broken away to illustrate important features thereof.

FIGS. 5–10 inclusive illustrate another form of a finishing wheel or tool designated by the numeral 50. The wheel 50 has an axis 51 and includes a cartridge or cage consisting of a pair of relatively thin and flat end plates or fixtures 52 and 54. Each plate 52 and 54 is of identical construction and is in the form of annulus or ring. Each plate 52 and 54 includes an outside radius $R_3$ and an inside radius $R_4$ as illustrated in FIG. 6. The outer peripery of each plate 52 and 54 is provided with a plurality of circumferentially spaced, radially extending, outwardly opening slots 56. The bottom surface 58 of each slot 56 is generally located on the radius $R_5$ as best illustrated in FIG. 6. The slots 56 are equally spaced apart, as an example, every six degrees, and are located at fixed points or places on the outer periphery of the end plates 52 and 54. Retainer means or abutments 60 are located radially inwardly and below the bottom surfaces 58 of the slots 56 and are used for a purpose to be hereinafter described.

Figure 7:
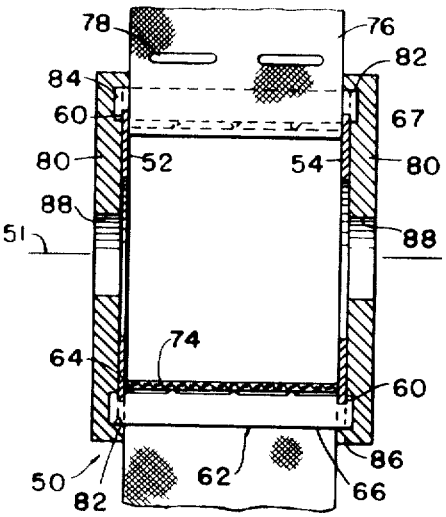
FIG. 7 is a sectional view of the finishing tool taken on the line 7—7 of FIG. 6.
Figure 8:
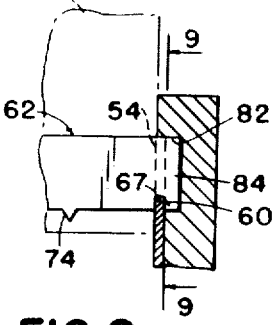
FIG. 8 is a fragmentary view partly in section illustrating the manner in which an [anchpor] *anchor* pin is connected to a fixture or end plate of the finishing tool.

The cartridge or cage further comprises a plurality of transversely extending, circumferentially spaced elongated anchor pins or elements 62 which are inserted in corresponding pairs of aligned slots 56 in the end plates or fixtures 52 and 54. Each elongated pin 62 is of substantially rectangular cross section and includes an inner edge 64 and an outer edge 66. The opposite ends of each pin 62 is provided with inwardly extending notches 67 in the inner edge 64. Each pin 6 is inserted into a pair of aligned slots 56 in end plates 52 and 54, with the notches 67 fitting over and firmly engaging the retainer means or abutments 60 as best illustrated in FIGS. 7 and 8.

Slots 56 are of uniform depth and width and each slot includes a pair of generally radially extending side walls 68 and 70 which are connected by *the* aforementioned bottom surface 58 adjacent the retainer means or abutment 60. Each pin 62 is anchored or fixed in a pair of laterally aligned slots 56 in the end plates and completely fills the slots, with the outer edge 66 of the pin 62 even with the outer periphery of the end plates located on radius $R_3$.

Figure 9:
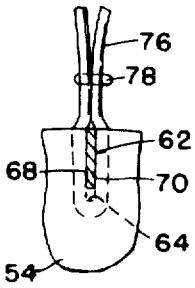
FIG. 9 is a view, partly in section, taken on the line 9—9 of FIG. 8.

Each pin 62 is provided on the inner edge 64 with inwardly extending prongs or projections 74, as an example, three in number. Finishing flaps 76 are appropriately connected to the anchor pins 62. The finishing flaps 76 are of U-shaped configuration with opposite sides thereof appropriately connected together around pins 62, as an example by means of staples 78 as shown in FIGS. 7 and 9. The flaps 76 may be made from any suitable material presently utilized such as sisal, coated abrasive cloth, cloth or other suitable fibrous materials or fabrics. The material may be dipped in a solution of resin or other suitable materials so as to vary the hardness of the flaps as is conventional in the art. The finishing flaps 76 extend radially outwardly and may be of any predetermined length. The finishing flaps 76 are also arranged in side by side relationship so as to form a relatively tight pack of finishing flaps. The prongs 74 provided on the pins 62 grip the inner surface of the finishing flaps 76 so as to hold the inner ends of the flaps 76 in a fixed position.

The end plates or fixtures 52 and 54 serve a number of important functions. The end plates locate each anchor pin 62 at a particular angular location on the periphery or circumference of the wheel. Thus a pair of aligned slots 56 locate the corresponding pin 62 at a given location on the circumference of the plates 52 and 54. The end plates 52 lock each pin 62 so that the pin cannot move radially inwardly toward the axis of the tool 50 or move circumferentially in either direction, or move lengthwise in either direction parallel to the rotary axis 51.

The plates 52 and 54 thus form a five-way lock with respect to each pin 62. The plates 52 and 54 prevent each pin 62 from moving radially inwardly as well as lengthwise in both directions parallel to the axis 51 due to the engagement of the abutments 60 with the surfaces defining the slots 67 in the pin 62. In addition the side surfaces of each pin 62 are in surface to surface contact with the side walls 68 and 70 of corresponding pairs of aligned slots 56. With such a construction the pins 62 are prevented from moving circumferentially or sideways in opposite directions. While the pins 62 are adapted to move radially outwardly such movement is prevented by the provision of a pair of end caps or covers 80. Each end cap or cover 80 is provided with a circumferentially extending endless groove 82 which is adapted to receive the overhanging end portions 84 of the pins 62 which project laterally beyond the outer surfaces of the end plates or fixtures 52 and 54. The grooves 82 have a uniform depth equal to the length of the overhanging portions 84. The outside diameter of the grooves 82 is approximately equal to the outside diameter of the end plates 52 and 54 while the inside diameter of the grooves 82 is approximately equal to the outside diameter of the end plates less the width of two pins 62 measured along the diameter of the wheel.

Each cover 80 further includes an annular rim 86 which engages the edges of the finishing flaps 76 as best illustrated in FIG. 7. Each cover 80 is provided with a centrally located hole or opening 88. The tool 50 is adapted to be mounted on and appropriately secured to a power driven shaft not shown, which extends through the centrally located openings in the wheel 50, in a manner well known and understood in the art.

The cartridge or cage including the end plates 52 and 54, pins 62, and finishing flaps 76 form a unit which is replaceable after wear. The end covers 80 which engage the outer surfaces of the end plates 52 and 54 when assembled as tool 50 are reusable with new cartridges.

The end plates 52 and 54, and pins 62 are made, as an example, from steel of sufficient strength which will withstand all of the forces normally encountered when the tool is used at high speeds in a surfacing operation. The end covers 80 may be made from aluminum or other suitable metals. The end plates 52 and 54 do not bend or buckle under normal use. The pins 62 also withstand the extreme forces tending to bend or buckle same laterally or lengthwise. Thus the cartridge is constructed and arranged to resist continuously the relatively extreme forces which are applied when the wheel 50 is rotated at high speeds in a conventional surfacing operation.

When all of the finishing flaps 76 are in place, the side surfaces of each flap are disposed in bearing engagement with the surfaces of the flaps 76 on each side. Each flap 76 thus reinforces and strengthens the others against any excessive circumferential bending at the secured ends. The rims 86 on the covers 80 help to fix the inner ends of flaps 76.

The finishing tool 50 is balanced due to the aforementioned features and such balance is maintained due in part to the fact that the pins 62 and finishing flaps 76 are maintained in fixed position.

Figure 10:
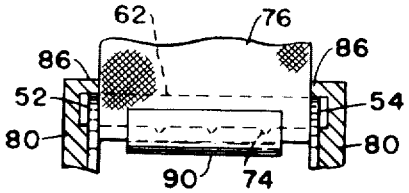
FIG. 10 is a fragmentary view partly in section illustrating a resilient clip for connecting a flap to the corresponding anchor pin of a finishing tool.

FIG. 10 illustrates another way of connecting a finishing flap 76 to an anchor pin 62 rather than using staples 78. A resiliently biased spring steel clip 90 of U shaped cross section is inserted over the inner end of the folded flap 76 so as to urge the sides of the flap 76 firmly against the pin 62.

It should also be appreciated that other forms of retainers may be utilized to prevent the pins 62 from moving radially outwardly. As an example, a retainer in the form of a ring or annulus could be utilized around the outer periphery of the overhanging end portions 84 of the pins 62 to prevent same from moving radially outwardly.

It has been found through actual use under normal operating conditions that the wheel 50 has a useful life substantially greater than that of similar wheels. Such tests have indicated that the pins 62 do not twist or turn and that no ripping of the flaps 76 occurs.

The drawings and the foregoing specification constitute a description of the improved finishing wheels in such full, clear, concise and exact terms as to enable any person skilled in the art to practice the invention, the scope of which is indicated by the appended claims.

What I claim as my invention is:

1. A finishing tool comprising a rotary cylindrical carrier having an axis, a plurality of circumferentially extending endless rims defining grooves of uniform depth therebetween in the outer surface of said carrier, a plurality of pins extending axially through said rims and said grooves and pivotally carried by said carrier, a plurality of generally radially extending finishing flaps having inner and outer ends, each flap being provided with retainer means on the inner end thereof which is received in said grooves, said pins extending through the retainer means of said finishing flaps so as to constitute the sole means for pivotally mounting said finishing flaps *yet being axially removable from said rims and retainer means to permit replacement of the flaps.*

[2. A finishing tool comprising a rotary carrier having an axis and a plurality of circumferentially extending endless annular grooves in the outer surface of said carrier and centered at said axis, a plurality of pins extending axially through said grooves and carried by portions of said carrier, a plurality of generally radially extending finishing flaps having inner and outer ends, each flap being provided with retainer means on the inner end thereof which is received in said grooves, said pins extending through the retainer means of said finishing flaps so as to constitute the sole means for pivotally mounting said finishing flaps.]

3. The finishing tool defined in claim [2] *1* wherein each of said retainer means is in the form of a belt lacing having a plurality of closed loops.

4. The finishing tool defined in claim [2] *1* wherein said rotary carrier is provided with an axially extending recess in each of the side faces thereof.

[5. The finishing tool defined in claim 2 wherein said gooves are of uniform depth.]

6. The finishing tool defined in claim [2] *1* wherein said rotary carrier is in the form of a one-piece cylindrical hub.

7. A finishing tool comprising a rotary carrier having an axis, a plurality of circumferentially extending endless grooves in the outer surface of said carrier, said carrier including annular rims intermediate said grooves, a plurality of angularly spaced openings extending through said rims and the end surfaces of said carrier, each opening being defined by a series of annular bearing points in said rims, a plurality of pins extending through said openings and pivotally carried by the bearing points on said carrier, a plurality of generally radially extending finishing flaps having inner and outer ends, each flap being provided with retainer means on the inner end thereof which is received in said grooves, said pins extending through said opening and the retainer means of said flaps so as to mount said finishing flaps for pivotal movement.

[8. The finishing tool defined in claim 2, in which said pins are pivotally mounted by said carrier portions.]

*9. In an abrasive drum, the combination of:*

*a hub of rigid material formed with a series of peripheral circumferential ribs separated by grooves,*

*each of said ribs having a series of circumferentially spaced openings therein, said openings being aligned in a series of rows extending longitudinally of the hub;*

*a circumferential series of spaced assemblies of abrasive sheets corresponding to said series of rows and positioned longitudinally of the hub,*

*each assembly having longitudinally spaced anchoring elements extending into the grooves of the hub along one of said rows; and*

*elongated retainer members extending through said rows of openings respectively in engagement with both said ribs and said anchoring elements to secure the assemblies to the hub.*

*10. A combination as set forth in Claim 9, in which said anchoring elements extend around the retainer members.*

*11. A combination as set forth in Claim 9, in which said grooves are spaced longitudinally from one another by said ribs in the direction of the axis of the hub,*

*said anchoring elements being fixed securely to each of the respective sheet assemblies adjacent a radially inner edge thereof,*

*and being spaced from one another in substantial correspondence with the longitudinal spacing of said grooves for engagement with the retainer members between said ribs.*

*12. A combination as set forth in Claim 10, in which said grooves are spaced longitudinally from one another by said ribs in the direction of the axis of the hub,*

*said anchoring elements being fixedly secured to each of the respective sheet assemblies adjacent a radially inner edge thereof,*

*and being spaced from one another in substantially correspondence with the longitudinal spacing of said grooves for engagement with the retainer members between said ribs.*

*13. A finishing tool comprising a rotary carrier having an axis and a plurality of circumferentially extending endless annular grooves in the outer surface of said carrier and centered at said axis, a plurality of pins extending axially through said grooves and carried by portions of said carrier, a plurality of generally radially extending finishing flaps having inner and outer ends, each flap being provided with retainer means on the inner end thereof which is received in said grooves, said pins extending through the retainer means of said finishing flaps.*

*14. The finishing tool defined in Claim 13, wherein said carrier has axially opposite end face members centered at said axis, between which end face members said annular grooves are located, the grooves being spaced axially by intermediate rib members coaxial with said face members, each of said flaps extending axially endwise across said grooves and end face members, the latter and said rib members having axially extending and aligned openings receiving said pins, with each pin received in common by aligned end face and rib member openings.*

*15. The finishing tool defined in Claim 13, wherein said retainer means is fixedly secured to each of said finishing flaps adjacent said inner end thereof.*

*16. The finishing tool defined in Claim 14, wherein said retainer means is fixedly secured to each of said finishing flaps adjacent said inner end thereof.*

References Cited

The following references, cited by the Examiner, are of record in the patented file of this patent or the original patent.

UNITED STATES PATENTS

| | | | |
|---|---|---|---|
| 339,585 | 4/1886 | Root | 15—181 |
| 1,897,971 | 2/1933 | Johnston | 51—337 |

FOREIGN PATENTS

| | | | |
|---|---|---|---|
| 836 | 1/1902 | Great Britain | 51—334 |

OTHELL M. SIMPSON, Primary Examiner